July 31, 1951     H. V. HANCE     2,562,188
TIME BASE GENERATOR
Filed Dec. 27, 1945
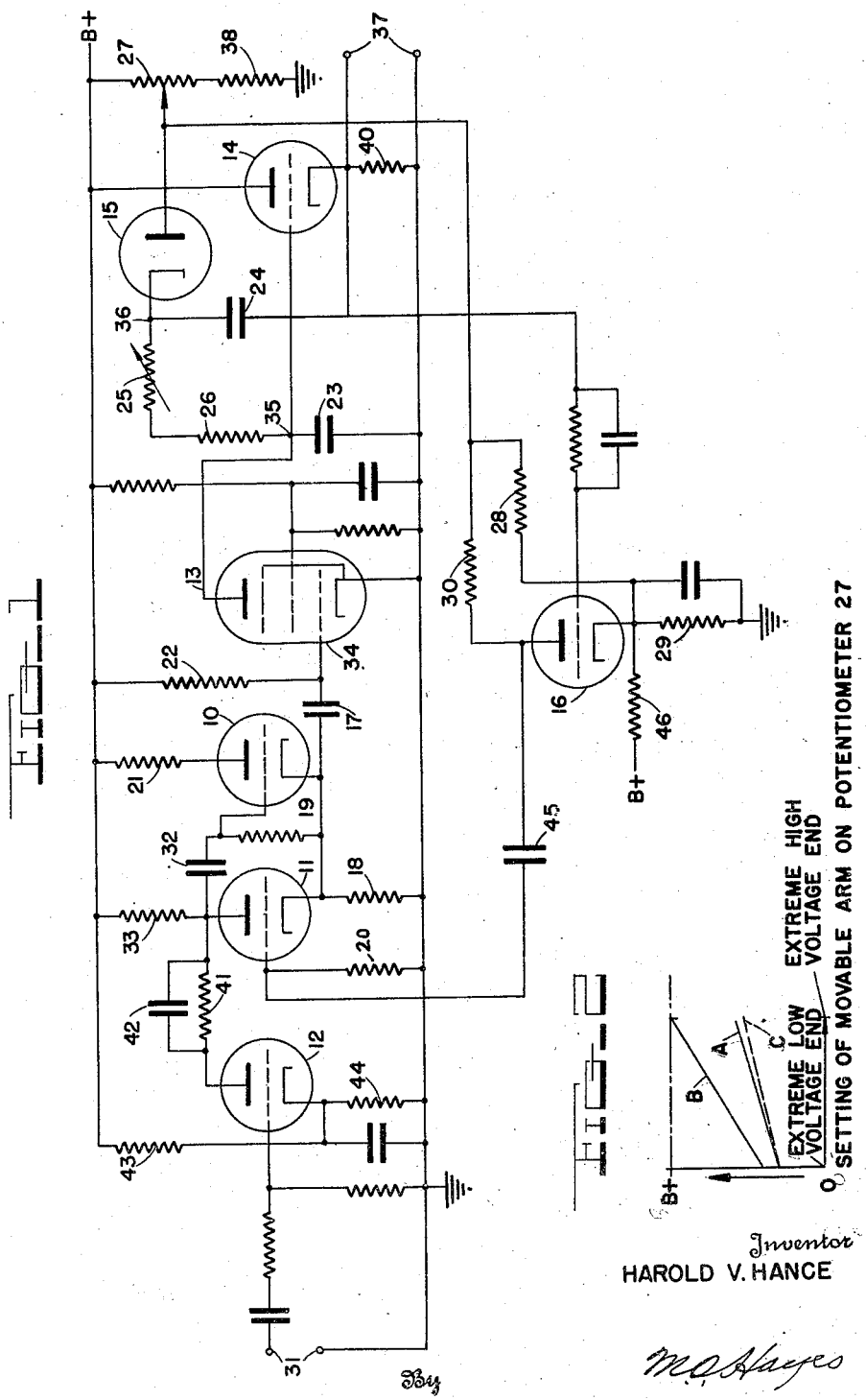
Inventor
HAROLD V. HANCE Patented July 31, 1951

2,562,188

UNITED STATES PATENT OFFICE 2,562,188

TIME BASE GENERATOR

Harold V. Hance, Washington, D. C.

Application December 27, 1945, Serial No. 637,476

5 Claims. (Cl. 250—27)

(Granted under the act of March 3, 1883, as amended April 30, 1928; 370 O. G. 757)

This invention relates generally to a cathode ray tube time base generator, and particularly to a cathode ray tube sweep generator in which sweep amplitude is unaffected by adjustments of sweep duration and vice versa.

In timing apparatus of the cathode ray oscillography type, such as that found in radio ranging equipment, a sawtooth sweep voltage is applied to and deflects the electron beam of the cathode ray tube in such a manner as to produce a linear time base trace. The sweep velocity and time duration of the time trace are known and fixed, so that the time base may readily be calibrated by means of any one of several well known electronic time marking generators. In producing such a time trace, the generation of the saw-tooth sweep voltage is generally synchronized with one incoming signal whose timing relative to a multiplicity of other signals is desired to be known. The other signals are then so displayed on the trace as to indicate, from the time base calibrations, the time relationship of such other signals with respect to the synchronizing signal. Under certain conditions of operation, however, the trace length may be disturbed and hence the accuracy of the calibrations is likewise disturbed. Among these conditions the most common and also the most troublesome are, variations in sweep duration, variations in supply voltages which result in corresponding variations in deflection sensitivity of the cathode ray tube, and variations in operational characteristics of different cathode ray tubes as experienced in tube replacement. Heretofore when such disturbances occurred, it was ordinarily necessary to correct the resulting variation in trace length by adjusting the sweep velocity. Consequently, in timing equipment where several different time duration sweeps may be selectably traced on a single cathode ray tube, it ordinarily becomes necessary to provide a separate velocity control for each sweep. It is accordingly an object of this invention to provide a cathode ray tube sweep generator in which a single velocity control suffices for the generation of sweep voltages of selectable duration.

It is another object of this invention to provide a cathode ray tube sweep generator in which the duration of the output waveform is a function of the sweep velocity.

It is another object of this invention to provide a cathode ray tube sweep generator in which amplitude and velocity adjustments of the sweep voltage are made by a single control.

It is another object of this invention to provide a linear, and constant duration cathode ray tube time base generator.

Other objects and features of the present invention will become apparent upon a careful consideration of the following detailed description, when taken together with the accompanying drawings.

Fig. 1 is a detailed circuit diagram of one embodiment of the invention, and

Fig. 2 is a voltage graph, useful in explicating the operation of Fig. 1.

The time base generator provided by the invention comprises, in its most elementary form, a saw-tooth voltage generator in combination with an amplitude responsive device. The saw-tooth voltage generator is arranged to produce a uniformly rising voltage waveform which is so applied to the amplitude responsive device that upon attainment of a selectable amplitude, the latter operates to produce a terminating signal; which signal is so fed back to the saw-tooth voltage generator as to shut-off so to speak, or to terminate the waveform produced by the saw-tooth generator. The selectable amplitude at which this action occurs, and the rate of rise, or velocity, of the waveform produced by the saw-tooth generator are adjustments made by a single control means.

In particular, reference is now had to the specialized embodiment of the invention shown in Fig. 1. In the figure, the saw-tooth generator comprises, a vacuum tube component 13 and a charging capacitor 23, connected in shunt therewith. Plate voltage for tube 13, also charging current for capacitor 23, is provided by way of resistances 25 and 26, unilateral impedance element 15, and the movable arm on potentiometer 27. The resistance of the latter is connected in series with fixed resistance 38 between B+ and ground. In the quiescent condition of the circuit, tube 13 is held conducting by reason of the connection of control grid 34 through resistance 22 to B+ potential. Accordingly, since tube 13 is held in a conducting condition, the voltage thereacross and hence the charge on capacitor 23 is substantially zero. Upon application of a negative blocking signal to the control grid 34, however, tube 13 is rendered non-conducting, and the current flowing therethrough is shunted to capacitor 23. At this instant the potential at point 35, i. e. the voltage across capacitor 23, starts and continues to rise for the duration of the applied blocking signal. At the end of the blocking signal, tube 13 is returned to conduction and capacitor 23 is abruptly discharged therethrough, to thus produce the trailing edge of the saw-tooth waveform. This waveform is applied to the grid of a second vacuum tube 14 which is cathode loaded by way of resistance 40, and across which the output terminals 37 of the circuit are taken. The gain of amplifier tube 14, as is typical of a cathode loaded amplifier, is substantially unity; so that the signal appearing at the circuit output is sensibly an uninverted replica of that developed across the charging capacitor 23. This signal is coupled back through capacitor 24 to the upper end, point 36, of resistances 25 and 26, so that points 35 and 36 rise together and by the same amount. Thus the voltage appearing across resistances 25 and 26 remains constant, consequently the condenser charging current flowing therethrough must remain constant. This being the case, the voltage waveform appearing at the output terminals is a uniformly rising sawtooth instead of the usual exponentially rising sawtooth waveform. Diode 15 is provided for the purpose of isolating the feedback voltage (voltage obtained from the circuit output terminals 37 and applied to point 36) from the supply circuit across which potentiometer 27 and resistance 38 are connected. Adjustment of the movable arm on potentiometer 27 varies the velocity or rate of rise of the sawtooth voltage waveform and as hereinafter described the amplitude of this waveform. That is, the higher the voltage at point 36 the greater the quiescent current flow through tube 13 and therefore the greater the charging current flow into condenser 23 is, when tube 13 is rendered non-conducting.

From the preceding paragraph it will be recognized that in order to generate a sawtooth voltage wave according to the circuit illustrated in Fig. 1, it is necessary to apply a negative blocking signal to the control grid 34 of tube 13. It will further be recognized that the duration of the sawtooth voltage wave is governed by the duration of such negative blocking signal. Accordingly, tube components 10 and 11 are provided and arranged to form a multivibrator type of rectangular blocking wave generator. In detail, the multivibrator shown in the figure is the type which remains in one stable state with one tube conducting and the other non-conducting, until keyed by an external signal. Whereupon the conducting conditions of the tubes will be reversed for a predetermined period of time, governed by a time constant circuit incorporated in the multivibrator. During the unstable condition of the multivibrator, which is represented by a reversal in the conducting conditions of the tubes 10 and 11, a negative signal is produced at the cathodes of the tubes and is applied through coupling capacitor 17 to the control grid 34 of tube 13. Specifically, the cathodes of both tubes 10 and 11 are connected to ground through a common resistance element 18. The grid of tube 10 is returned to its cathode through resistance 19, while the grid of tube 11 is returned to ground through resistance 20. Thus tube 10 operates at zero bias, and tube 11 operates at a bias determined by the voltage developed across resistance 18. By proper selection of plate resistance 21 for tube 10 and cathode resistance 18, the zero bias current for tube 10 is made such that the voltage developed across resistance 18, due to the current flow through tube 10, is sufficient to bias tube 11 to cut-off.

This condition represents the signal stable state of the multivibrator. To change this state of the multivibrator into the unstable state, during which the negative blocking signal for producing the sawtooth wave is generated, a keying tube 12 is connected via resistance 41 and capacitance 42 to the plate of tube 11. The plate of tube 11 is in turn connected via charging capacitor 32 to the grid of tube 10. Tube 12 is biased to cut-off by way of its cathode connection to the junction point of resistance 43 and 44 which are connected in series between B+ and ground. Upon application of a positive trigger signal at terminals 31, tube 12 is rendered conducting and applies a negative signal through coupling capacitor 32 to the grid of tube 10. Whereupon tube 10 is rendered non-conducting, and, by way of the common cathode coupling resistance 18, tube 11 is rendered conducting. As tube 11 is rendered conducting, capacitor 32 discharges through resistance 19 to hold tube 11 cut-off for a period of time depending upon the time constant formed primarily by capacitor 32 and resistance 19. This represents the unstable state of the multivibrator, which, since tube 11 operates at a bias more negative than that at which tube 10 functions, will cause a negative pulse to appear across the cathode coupling resistance 18. This negative pulse is of a duration determined by the unstable state of the multivibrator, and is applied to tube 13 to cause the generation of the sawtooth signal at terminal 37 as above mentioned.

For purposes of terminating the sawtooth sweep voltage at a constant duration, the sawtooth waveform appearing at the output terminals 37 is coupled to an amplitude responsive device, which generates a signal in response to a selectable amplitude in the sawtooth waveform. This signal is applied to and trips the multivibrator back to its stable state to produce the trailing edge of the negative blocking signal, and to thereby stop the generation of the sawtooth voltage signal. As here exemplified, the amplitude responsive device comprises a vacuum tube component 16 whose control grid is connected to the output terminals 37. Bias for tube 16 is obtained by means of its cathode connection to the junction point of resistances 28 and 29, which are connected between the movable tap on potentiometer 27 and ground. Plate voltage for tube 16 is also obtained from the movable arm of potentiometer 27 by means of the plate load resistance 30.

As thus connected the voltage at the cathode of tube 16 relative to ground potential is a straight line function of the setting of the movable arm on potentiometer 27. That is, the voltage at the cathode of tube 16 rises linearly as the movable arm of potentiometer 27 is moved up from the low voltage end of the resistance of potentiometer 27 to the high voltage end thereof. A graph illustrating the approximate relationship of the voltages impressed on tube 16 is shown in Fig. 2. In this figure the setting of the movable arm on potentiometer 27 is plotted along the horizontal, and the voltage relative to ground is plotted along the vertical. Line A represents the manner in which the voltage at the cathode of tube 16 varies as the movable arm on potentiometer 27 is varied from the low voltage end of the potentiometer to the high voltage end. As indicated, when the arm on potentiometer 27 is adjusted to the low voltage end of potentiometer 27, the voltage at the cathode is a fraction of the voltage appearing across resistance 38. This fraction is determined by the voltage divider action of resistances 28 and 29. When the movable arm is adjusted to the high voltage end of potentiometer 27, the voltage at the cathode of tube 16 is a similar fraction of B+ potential. It will be recognized that since the plate voltage for tube 16 is also obtained from the movable arm of potentiometer 27, it will likewise be a straight line function of the setting of potentiometer 27. Line B represents the manner in which the voltage at the plate of tube 16 varies with the setting of potentiometer 27. From Fig. 2 it will be noticed that since the plate and cathode voltages for tube 16 are both obtained from the potentiometer 27 the voltage across the tube will remain more nearly constant than if the plate voltage for the tube were taken from the B+ supply. Therefore, since the voltage across the tube remains relatively constant the cut-off potential of the tube relative to ground, as represented by the dotted line C, will for all practical purposes parallel the cathode potential line A. In generation of the sawtooth waveform, the potential at the output terminals 37 rises uniformly to a voltage which is substantially that of the voltage at the cathode of tube 16. Whereupon tube 16, which is preferably of the sharp cut-off variety, is rendered conducting and its plate potential drops abruptly negative. This drop in potential is communicated through capacitor 45 to the grid of tube 11 in the multivibrator, to render tube 11 non-conducting and return the multivibrator to its single stable state. As the multivibrator is returned to its stable state, tube 13 is returned to conduction thereby terminating the sawtooth waveform.

From the foregoing, it will be observed that the rate of rise of the sawtooth waveform, i. e. its velocity, and the cut-off level for tube 16 are simultaneously controlled by potentiometer 27, and in such a manner that the tendency is for a constant duration sawtooth waveform to result. That is, as potentiometer 27 is adjusted so as to increase the velocity of the sweep voltage, the potential at the cathode of tube 16 is simultaneously raised, thereby raising the seletctable amplitude at which the sweep voltage is terminated. In particular, this feature of the circuit may be understood from the following simple mathematical analysis:

(1) $$T = \frac{CV_c}{I}$$

Where $V_c$ is the potential above ground at which conduction in tube 16 occurs. I is the charging current flowing into capacitor 23. T is the duration of the sawtooth waveform, and C the magnitude of capacitor 23.

But, (2) $$I = \frac{E}{R}$$

Where R is the total resistance in the path comprising diode 15, resistance 25 and 26 and tube 13, and E is the potential at the movable arm of potentiometer 27.

Therefore, substitute the value of I from Equation 2 into Equation 1, (3) $$T = \frac{CV_c R}{E}$$

But since the bias voltage $V_c$ for tube 16 is obtained through the divider action comprising resistances 28 and 29 in combination with the action of potentiometer 27, (4) $$V_c = KE$$

Where K is a constant of proportionality determined by resistors 28 and 29.

Thus, (5) $$T = \frac{CKER}{E} = KCR$$

Since K, C and R are all constants, T must be constant.

It is to be understood that the above mathematical analysis is not intended to be rigorous in character, but is merely meant to illustrate the mode of operation of the circuit. There are, for instance, certain factors which have been omitted in the analysis; such as the fact that the sawtooth waveform appearing at terminals 37 does not start at zero but at some voltage more positive than zero depending on the quiescent voltage developed across resistance 40. To nullify the effect of this voltage on the operation of tube 16, resistor 46 is connected between B+ potential and the cathode of tube 16. The magnitude of this resistor relative to resistor 29 is made such as to raise the voltage existing at the cathode of tube 16 above that which would normally exist thereat by an amount equal to the quiescent voltage existing across resistance 40. From the above analysis, it will be recognized that among other things, the ratio of resistances 28 and 29 determine the value of K in the last equation, and hence the duration of the sawtooth sweep voltage. That is for a given ratio of the resistances 28 and 29 and a given value of RC in the above equation the duration of the sawtooth sweep voltage will be fixed irrespective of the setting of amplitude control 27. Also from the foregoing analysis it becomes apparent that if either resistance 25 or 26 is made variable the value of R in the last equation can be varied so as to thereby provide a means of adjustment of the duration of the sawtooth waveform.

Although I have shown and described only a certain and specific embodiment of the invention I am fully aware of the many modifications possible thereof. Therefore this invention is not to be limited except insofar as is necessitated by the spirit of the prior art and the scope of the appended claims.

The invention described herein may be manufactured and used by or for the Government of the United States of America for governmental purposes without the payment of any royalties thereon or therefor.

What is claimed is:

1. A time base generator comprising, a rectangular wave generator, a sawtooth wave generator coupled to said rectangular wave generator and arranged to produce a uniformly rising waveform in response to and for the duration of the output signal from said rectangular wave generator, biased limiting means responsive to the attainment of a selectable amplitude in said sawtooth waveform for transmitting a terminating signal to the rectangular wave generator, and an adjustable voltage supply means coupled to both said saw-tooth wave generator and said biased limiting circuit for synchronously varying said selectable amplitude and rate of rise of said sawtooth waveform in such a manner as to maintain said sawtooth waveform at a constant duration irrespective of said rate of rise.

2. A time base generator comprising, a rectangular wave generator, a sawtooth wave generator coupled to said rectangular wave generator and arranged to produce a uniformly rising waveform in response to and for the duration of the output signal from said rectangular wave generator, biased vacuum tube amplifier responsive to the attainment of a selectable amplitude in said sawtooth waveform for producing a terminating signal, means applying said terminating signal to said rectangular wave generator for terminating the output signal therefrom, and an adjustable voltage supply means coupled to said saw-tooth wave generator and said biased vacuum tube amplifier for synchronously varying said selectable amplitude and rate of rise of said sawtooth waveform in such a manner as to maintain said sawtooth waveform at a constant duration irrespective of said rate of rise.

3. A time base generator comprising, a resistance capacitance charging circuit, a discharge tube connected across the capacitance of said charging circuit, a rectangular wave voltage generator coupled to said discharge tube for initiating a blocking voltage therefor, a biased limiting circuit coupled to the capacitance of said charging circuit to receive the voltage developed thereacross and for supplying a terminating pulse to said rectangular voltage wave generator when the voltage across the capacitance of said charging circuit attains a selected amplitude predeterminedly related to the bias of said bias limiting circuit, and a single adjustable voltage supply means coupled to said charging circuit to supply charging current therefor and to said biased limiting circuit to adjust the bias thereon.

4. A time base generator comprising, a resistance capacitance charging circuit, a discharge tube connected across the capacitance of said charging circuit, a rectangular wave voltage generator coupled to said discharge tube for initiating a blocking voltage therefor, a vacuum tube including, plate, cathode and grid electrodes the grid electrode of which is coupled to the capacitance of the charging circuit and the plate of which is coupled to the rectangular wave voltage generator to supply a terminating pulse thereto when the voltage across said capacitance exceeds the grid cathode bias on said tube, and a single adjustable voltage supply means coupled to said charging circuit to supply charging current therefor and to the grid cathode circuit of said tube to adjust the bias thereon.

5. A time base generator comprising, a sawtooth voltage generator for initiating the production of a saw-tooth voltage wave, a voltage supply terminal for said generator operative to control the slope of the saw-tooth generated in accordance with the magnitude of the applied voltage, a biased limiting circuit coupled to said generator to receive the voltage wave produced thereby and to supply a terminating signal to said generator when said voltage wave attains a selective amplitude predeterminedly related to the bias voltage of said limiting circuit, and a single adjustable voltage supply means coupled to the supply terminal of said generator to supply a voltage thereto and to the biased limiting circuit to control the bias thereon.

HAROLD V. HANCE.

REFERENCES CITED

The following references are of record in the file of this patent:

UNITED STATES PATENTS

| Number | Name | Date |
|---|---|---|
| 2,251,851 | Moore | Aug. 5, 1941 |
| 2,264,731 | Wheeler | Dec. 2, 1941 |
| 2,265,290 | Knick | Dec. 9, 1941 |
| 2,412,064 | Moe | Dec. 3, 1946 |
| 2,413,182 | Hollingsworth et al. | Dec. 24, 1946 |
| 2,414,486 | Rieke | Jan. 21, 1947 |